US006438069B1

(12) United States Patent
Ross et al.

(10) Patent No.: US 6,438,069 B1
(45) Date of Patent: Aug. 20, 2002

(54) METHOD FOR TIME LAPSE RESERVOIR MONITORING

(75) Inventors: Christopher Philip Ross, Houston; Mehmet Suat Altan, Sugarland, both of TX (US)

(73) Assignee: PGS Data Processing, Inc., Houston, TX (US)

( * ) Notice: Subject to any disclaimer, the term of this patent is extended or adjusted under 35 U.S.C. 154(b) by 0 days.

(21) Appl. No.: 09/242,232
(22) PCT Filed: Sep. 11, 1997
(86) PCT No.: PCT/US97/16054
  § 371 (c)(1),
  (2), (4) Date: Feb. 5, 1999
(87) PCT Pub. No.: WO98/11455
  PCT Pub. Date: Mar. 19, 1998

Related U.S. Application Data (63) Continuation-in-part of application No. 08/713,948, filed on Sep. 13, 1996, now abandoned.
(51) Int. Cl.[7] .................................................. G01V 1/28
(52) U.S. Cl. ........................................... 367/73; 367/46
(58) Field of Search ............................. 367/13, 38, 73, 367/46

(56) References Cited

U.S. PATENT DOCUMENTS

| | | | | |
|---|---|---|---|---|
| 3,921,126 A | * | 11/1975 | Waters | 367/40 |
| 4,688,198 A | | 8/1987 | Wiggins | 367/46 |
| 4,715,021 A | | 12/1987 | Dittert | |
| 4,969,130 A | * | 11/1990 | Wason et al. | 367/73 |
| 5,010,976 A | * | 4/1991 | Airhart | 367/46 |
| 5,173,879 A | | 12/1992 | Cung et al. | |
| 5,309,360 A | * | 5/1994 | Monk et al. | 364/420 |
| 5,400,299 A | | 3/1995 | Trantham | |
| 5,586,082 A | * | 12/1996 | Anderson et al. | 367/73 |

FOREIGN PATENT DOCUMENTS

| | | |
|---|---|---|
| WO | WO 96/27141 | 9/1996 |

OTHER PUBLICATIONS

Greaves et al., "New Dimensions in Geophysics for Reservoir Monitoring," New Mexico Tech Centennial Symposium, (Socorro, New Mexico) NMT 89005, pp. 19–32, Oct. 1989.*
Johnstad et al., "Reservoir Monitoring over a producing Norwegian Oil Field" 67th Annual SPE Tech. Conf. and Exhibition, Washington, D.C., SPE 24876, pp. 119–122, Oct. 1992.*
Nur, A., "Seismic Reservoir Description and Monitoring" 12th World Petroleum Congr. (Houston, Texas) Proc. V2, pp. 133–141, Apr. 1987.*
Johnson, D H, "A tutorial on time lapse seismic reservoir monitoring" J. Petrol. Tech., vol. 49, No. 5, pp. 473–475, May 1997.*
Ross, C. P., et al., "Inside the Crossequalization Black Box," The Leading Edge, v. 15, No. 11, pp. 1233–1240 (Nov. 1996).
Greaves, Robert J. et al., "Three–dimensional seismic monitoring of an enhanced oil recovery process," Geophysics, Sep. 1987, vol. 52, No. 9, pp. 1175–1187.

(List continued on next page.)

*Primary Examiner*—Ian J. Lobo (57) ABSTRACT

A method of comparing multiple seismic survey data sets of a reservoir, is provided, wherein a first seismic survey data set is taken at a first time and a second seismic survey data set is taken at a second time, to detect changes in the reservoir between the first time and the second time. Generally, the method comprises design of a crossequalization function for the second data set based on a comparison of unchanging portions of the two data sets. Also provided is a processing method for preparing each survey according to similar processing steps with information taken from each survey.

45 Claims, 9 Drawing Sheets

OTHER PUBLICATIONS

Lumley, David E., "4–D seismic monitoring of an active steamflood," Stanford University, pp. 1–3.

Paulsson, B.N.P. et al., "The Steepbank crosswell seismic project: Reservoir definition and evaluation of steamflood technology in Alberta tar sands," The Leading Edge, Jul. 1994, pp. 737–747.

Anderson, Roger, "How 4–D Seismic Monitoring Works," Explorer, Sep., 1996, pp. 24–26.

C. R. Ross et al, "Time–lapse seismic monitoring: Some shortcomings in non–uniform processing", Leading Edge, vol. 16, No. 6, pp. 931–937 (Jun. 1997).

* cited by examiner

METHOD FOR TIME LAPSE RESERVOIR MONITORING

This application is a continuation-in-part of U.S. application Ser. No. 08/713,948, Sep. 13, 1996, abn, assigned to the assignee of the present invention, and including an inventor common to the inventors of the present invention.

BACKGROUND OF THE INVENTION

This invention relates to oil and gas reservoir management and, more specifically, to time lapse reservoir seismic signal processing.

Reservoir characterization and monitoring in the oil and gas field are important parts of reservoir management and hydrocarbon production. Effective reservoir management is a major goal of energy producing companies as they try to reduce finding costs, optimize drilling locations and increase financial returns. One technique that is attempted in this endeavor is time-lapse (also known as 4D) seismic monitoring. As fluids are extracted, swept, or injected through production and recovery, changes in the effective elastic properties of the reservoir rocks occur. The ability to monitor reservoir changes as a function of time by the use of seismic methods can lead to better location of production and infill wells, the possibility of locating unswept zones, and more efficient field maintenance, thus raising the overall value of the production lease.

In a two-dimensional approach, seismic monitoring has been examined in crosswell procedures. However, the repeated results have only been qualitatively compared, and two dimensional time-lapse surveys, so far, do not contain the type of information desired in modern reservoir management (for example, see Paulsson, et. al, 1994, *The Leading Edge*, incorporated herein by reference). Time-lapse 3D techniques have also been attempted, but they involve complex modeling procedures and require a great deal of processing without using direct data available in the survey itself. See, e.g., U.S. Pat. No. 4,969,130, incorporated herein by reference.

One problem in time lapse processing is that many conditions change over time, not just the changes in the state of the reservoir. For example, the locations of the source and receiver in the second survey will necessarily be different from those in the first. Further, the tide in a second marine survey may be higher or lower, as may the temperature of the air and water. Likewise, the specific characteristics of the sources and receivers used in the second survey will be different. Other differences, besides changes in reservoir state also occur, such as differences in the manner in which the two surveys are processed. Thus, there is a need for a method of dealing with the two surveys whereby processing differences do not detrimentally affect the result of the comparison.

For example, in gathering seismic data, a source is used to generate seismic waves which reflect from the reflectors in the earth (e.g. layer boundaries) and are received at receivers. In some cases, the source signature is a spike, although, in reality, it is not perfect. During its journey through the strata and reflectors, the signal shape is changed, and the reflection signal received at the receivers is, therefore, no longer a spike, or even close. Deconvolution is the process by which the shape of the reflection signal is "whitened" to recreate the spike shape of the data.

In another example, a broad, band-limited signal is used, which is zero phase. Deconvolution is used in such a case to remove the distortions caused by the earth.

In still another example, in performing the deconvolution in the frequency domain, all frequency samples are multiplied to bring them to an equal level, following the assumption that the source is a minimum phase signal, immediately rising to a peak and then dying. This is accomplished by autocorrelating the trace in the time domain multiple times, at a series of lag samples, which results in a generally symmetrical wavelet. The power spectrum of the wavelet is then analyzed, to determine what multipliers are needed at each frequency to flatten the frequency spectrum. This process is performed on a windowed basis, both along each trace, and across the record (as used herein, the term "record" refers to, alternatively for example, a common receiver record, a CMP record, a common shot record, a stacked trace record, etc.) The autocorrelation is performed on various windows, and the results are averaged to give the spectrum. From that spectrum, the operators needed to flatten the spectrum are chosen. The operators are then applied to all of the traces used in the input. Typically, the window is about 10 times the length of the operator to be generated, measured in number of samples. The deconvolution process and the design of a deconvolution operator are well known in the art, and it is not limited to the frequency domain example, above. It is also routinely performed in the time domain. See, e.g., Yilmaz, *Investigations in Geophysics*, Vol. 2, *Seismic Data Processing*, Society of Exploration Geophysicists (1987) and references cited therein.

In performing deconvolution, it is important to design a deconvolution operator dependent upon the data of the survey, in order to account for the specific source signature, and other equipment distortions that occur in the data. Therefore, the data in each survey has been adjusted through the use of a specific optimum deconvolution operator which is not applicable to other surveys. The result of this difference in the use of the separate deconvolution operators in time-lapse surveys is that structure appears in the difference records when two records are subtracted. This result is undesirable. However, to date, no one has proposed a practical solution to the problem.

SUMMARY OF THE INVENTION

It is an object of the present invention to address the above problems.

It has been found that, contrary to earlier beliefs, a single deconvolution operator can be used on multiple sets of data, not only without detrimental results, but improving the quality of the processing of time-lapse comparisons of seismic surveys. Accordingly, in one aspect of the present invention, a method of deconvolution of multiple sets of seismic data from the same geographic area is provided, the method comprising: designing of a deconvolution operator dependent upon data from at least two of the sets of seismic data, wherein the at least two sets of seismic data were recorded at different times or calendar dates; applying the deconvolution operator in a deconvolution process to both of the at least two sets of data; and conducting further time-lapse processing to form a difference record.

According to one embodiment of the invention, the conducting of further time-lapse processing comprises: providing a first reflection event (for example, a wavelet) in the first seismic survey data set having a corresponding second reflection event in the second seismic survey data set, wherein the first reflection event and the second reflection event represent an unchanged portion of geologic structure in or near the reservoir and wherein the first reflection event is represented by a first set of event parameters and the second reflection event is represented by a second set of event parameters. Next, an acceptance threshold difference function between the first set of event parameters and the second set of event parameters is provided. Then, a crossequalization function is determined to apply to the second set of event parameters.

According to another aspect of the invention, the crossequalization function is determined such that, upon application of the crossequalization function to the second set of event parameters, a crossequalized set of event parameters is defined, and the difference between the first set of event parameters and the crossequalized set of event parameters is below the threshold difference function. Next, the crossequalization function is applied to a third reflection event, the third reflection event being related to the second data set, wherein a crossequalized third reflection event is defined, wherein the third reflection event has a corresponding fourth reflection event in the first data set, and wherein the third and fourth reflection events represent a changing portion of the reservoir.

Comparison of the crossequalized third reflection event to the fourth reflection event by subtracting the crossequalized third reflection event from the fourth reflection event results in the desired information.

According to a more specific example embodiment, said providing said acceptance threshold difference function comprises: iterative selection of event parameter modifications to the second set of event parameters, application of the event parameter modifications to the second set of event parameters, wherein a modified set of event parameters is defined, comparison of the modified set of event parameters to the first set of event parameters, wherein said iterative selection continues until a convergence is reached, and wherein the acceptance threshold difference function comprises the modified set of event parameters at convergence. Example event parameters comprise any combination of amplitude, phase, bandwidth, and time, or any of the foregoing individually.

According to another example embodiment, the determining of the crossequalization function comprises: iterative selection of event parameter modifications to the second set of event parameters, application of the event parameter modifications to the second set of event parameters, wherein a modified set of event parameters is defined, comparison of the modified set of event parameters to the first set of event parameters, and providing an acceptance threshold difference, wherein said iterative selection continues until a comparison result from said comparison designates a difference between the first set of event parameters and the modified set of event parameters below the acceptance threshold difference.

According to yet another example embodiment, said providing an acceptance threshold difference function comprises: providing a windowed trace difference between a time window of a first trace from the first seismic survey data set and a time window of a second trace from the second seismic survey data set, wherein the second trace includes reflection events corresponding to reflection events in the first trace and wherein the time window of the second trace is substantially the same as the time window of the first trace, and providing a ratio of the windowed trace difference over the time window of the first trace, and choosing the acceptance threshold difference to be less than the ratio.

The time windows in both the unchanging and changing portions of the reservoir have similar spectral characteristics. For example, if the data from the reservoir has a dominant frequency of 30 Hz, the time window used should be picked from an unchanging portion of the survey having a dominant frequency as close to 30 Hz as possible. Likewise, phase changes in the reservoir and the unchanging portion should be as close as possible. It is preferred, however, to err on the side of broader time windows. For example, if the reservoir dominant frequency is 30 Hz, a window having 35 Hz is considered preferable to one of 25 Hz. Such bandwidth error of less than about 25% in frequency bandwidth is believed to yield adequate results. Best results should be seen when bandwidth error is below 10%.

In still another embodiment, said providing an acceptance threshold difference function comprises: providing a windowed trace difference between a time window of the square of a first trace from the first seismic survey data set and a time window of the square of a second trace from the second seismic survey data set, wherein the second trace includes reflection events corresponding to reflection events in the first trace and wherein the time window of the second trace is substantially the same as the time window of the first trace, and providing a ratio of the windowed trace difference over the time window of the square of the first trace, choosing the acceptance threshold difference to be less than the ratio.

In still another embodiment, said applying the crossequalization function to a third reflection event in the second data set comprises convolution between the crossequalization function and the third reflection event in the second data set, said first data set comprises a trace from a seismic receiver. Alternatively, said first data set and said second data set comprise a summed set of traces from a set of seismic receivers, or CMP ("common mid-point") data. In still a further embodiment, said first data set and said second data set comprise shot data. In further alternatives, said first data set and said second data set comprise prestack data or migrated data.

In many embodiments, said first data set and said second data set are subjected to equivalent prestack processes. For example, in addition to the deconvolution described above, in some embodiments the first data set uses the same designature process as the second data set, the same noise attenuation processing steps as second data set, and the same multiple attenuation processing as the second data set. Further, in many embodiments, the same DMO operator is used on first data set as on the second data set, and migration on the first data set is conducted with the same velocity field as migration on the second data set.

Finally according to a further aspect of the invention, a method is provided for performing time-lapse seismic survey signal processing, the method comprising: performing a set of processing steps on the first survey; performing the set of processing steps on the second survey, wherein the set of processing steps is dependent upon a set of seismic signal parameters; choosing at least one of the set of parameters by a selection process dependent upon data from both surveys; and (b) applying the at least one of the sets of parameters in the at least one of the set of processing steps to both the first survey and the second survey.

DESCRIPTION OF THE DRAWINGS

For a more complete understanding of the present invention and for further advantages thereof, reference is made to the following Description of Example Embodiments of the Invention, taken in conjunction with the accompanying drawings, in which.

It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS OF THE INVENTION

As used herein, "crossequalization" is the catch-all industry term for the match-filtering, amplitude scaling and static corrections necessary for time-lapse seismic monitoring. In essence, a wavelet operator or operators are estimated to shape and match the reflection data from one survey to another. Typically, operators are designed over static reflectors that exclude the reservoir where meaningful changes in (pore) fluid state may occur. Theoretically, the difference between two volumes of data after crossequalization should be zero everywhere (inside and outside the design window) except where there are changes in the reservoir. All of the static or non-reservoir events should be subtracted out, leaving only changes in dynamic events (i.e., fluid replacement within the pores).

Whether a change in the reservoir state is seismically detectable is determined by the reservoir's lithology and the acoustic properties of the pore fluids (which are temperature and pressure dependent), the type of production or recovery process, the resolution (spatial and temporal) of the data, in addition to the repeatability of the seismic system. In certain reservoirs with gas drives, gas injection may reduce the acoustic impedance (oil being displaced by gas) sufficiently to induce a bright spot. See, e.g., Fulp and Greaves, GEOPHYSICS, 1987, incorporated herein by reference, for a bright spot generated by a fire flood. In others, gas injection or water injection (water drive) may have the opposite reaction and generate a dim spot. Where steam flooding is involved, velocity pull-down or sag often is used to indicate steam fronts to determine to what extent the recovery has progressed. For example, see Lumley, et. al., SEG Expanded Abstracts, 1995, incorporated herein by reference. As aforementioned, petrophysical and seismic interpretation are required to understand what attribute is meaningful, and how much change one might observe.

Processing

The rudimentary data processing steps toward the goal of obtaining spatially-correct, relative amplitude preserved data include NMO/DMO and prestack (zero-offset) migration used for the forthcoming examples. Other appropriate prestack procedures will occur to those of skill in the art, including data compression and sampling techniques that can be employed to reduce the computational overhead and preserve the quality of the prestack processing that will occur to those of skill in the art. After such processing, relative amplitude data conditioning yields prestack migrated CMP data on which crossequalization and time-lapse differencing measures are performed. Depending on the producing reservoir, according to alternative embodiments of the invention, CMPs, AVO attributes, and/or migrated stacks from each survey are crossequalized and subtracted (differenced) to observe interpore fluid displacements.

It is recommended that each survey be processed as close to identically as possible (which is not normally done in time-lapse processing). Before the present invention, whatever processed data existed on workstations (with dissimilar preconditioning procedures and algorithms) was used, and removal of the resultant variations in data was attempted through crossequalization. Better crossequalizations and more meaningful seismic differences will be obtained by reprocessing existing data with the same methodology and software as the recent seismic monitoring survey. Thus, it is particularly preferred to designature, deconvolve, attenuate noise and multiples with the same parameterization, survey to survey, just as it is important to use the same DMO operator and migrate the data with the same velocity field, to obtain premier time-lapse measurements.

Therefore, according to one aspect of the invention, a method is provided for performing time-lapse seismic survey signal processing, wherein a set of processing steps is performed on the first survey, the set of processing steps in performed on the second survey, and the set of processing steps is dependent upon a set of seismic signal parameters, the method comprising: (a) choosing at least one of the set of parameters by a selection process dependent upon data from both surveys; and (b) applying the at least one of the sets of parameters in the at least one of the set of processing steps to both the first survey and the second survey.

For example, it has been found that improved deconvolution processing of the two surveys results from the design of a deconvolution operator dependent upon multiple sets of data. This deconvolution operator is then applied to both data sets. The result of such a design, while perhaps not optimum for either particular set, is, nevertheless, optimum for time-lapse comparison purposes.

According to one example embodiment of this aspect of the invention, a method of deconvolution of multiple sets of seismic data from the same geographic area is provided, the method comprising: designing of a deconvolution operator dependent upon data from at least two of the sets of seismic data, wherein the at least two sets of seismic data were recorded at different times; applying the deconvolution operator in a deconvolution process to both of the at least two sets of data; and conducting further time-lapse processing to form a difference record. In some cases, there are at least three sets of seismic data, wherein each of the at least three set represents recordings from surveys conducted at different times, and wherein the designing of a deconvolution operator is dependent upon data from each of the sets of surveys. In some of these cases, a further step is provided, comprising designing a second deconvolution operator dependent upon data from the first and the third sets of data, the second deconvolution operator being applied to the first set of data and the third set of data. The first set of data may have been taken before or after the second set of data with equal effectiveness.

According to a more specific example embodiment, the design of the first deconvolution operator comprises: averaging of a power spectrum for a first ensemble of traces from the first set; averaging of a power spectrum for a second ensemble of traces from the second set; averaging of the power spectrum averages of the first and the second ensemble; and designing a deconvolution operator for the first and the second survey from the averaging of the power spectrums of the first and the second ensemble.

In some circumstances, the above averaging for each subsequent survey would be prohibitively expensive. Therefore, according to an even further embodiment of the invention, multiple surveys are handled by storing the averaging of the first survey, so that when a later survey is made, the first survey's autocorrelations will not have to be recalculated. According to such an embodiment, the designing of the first deconvolution operator comprises: averaging of a power spectrum for a first ensemble of traces from the first set; inverse transforming the average into a time-domain representation of the average for the power spectrum of the first ensemble; storing the time-domain representation; averaging of a power spectrum for a second ensemble of traces from the second set; inverse transforming the average into a time-domain representation of the average of the power spectrum for the second ensemble; averaging of the time-domain representations of the averages for the power spectrum of the first and the second ensemble; and designing a deconvolution operator for the first and the second survey from the average of the time-domain representations of the averages for the power spectrum of the first and the second ensemble.

Figure 1A:
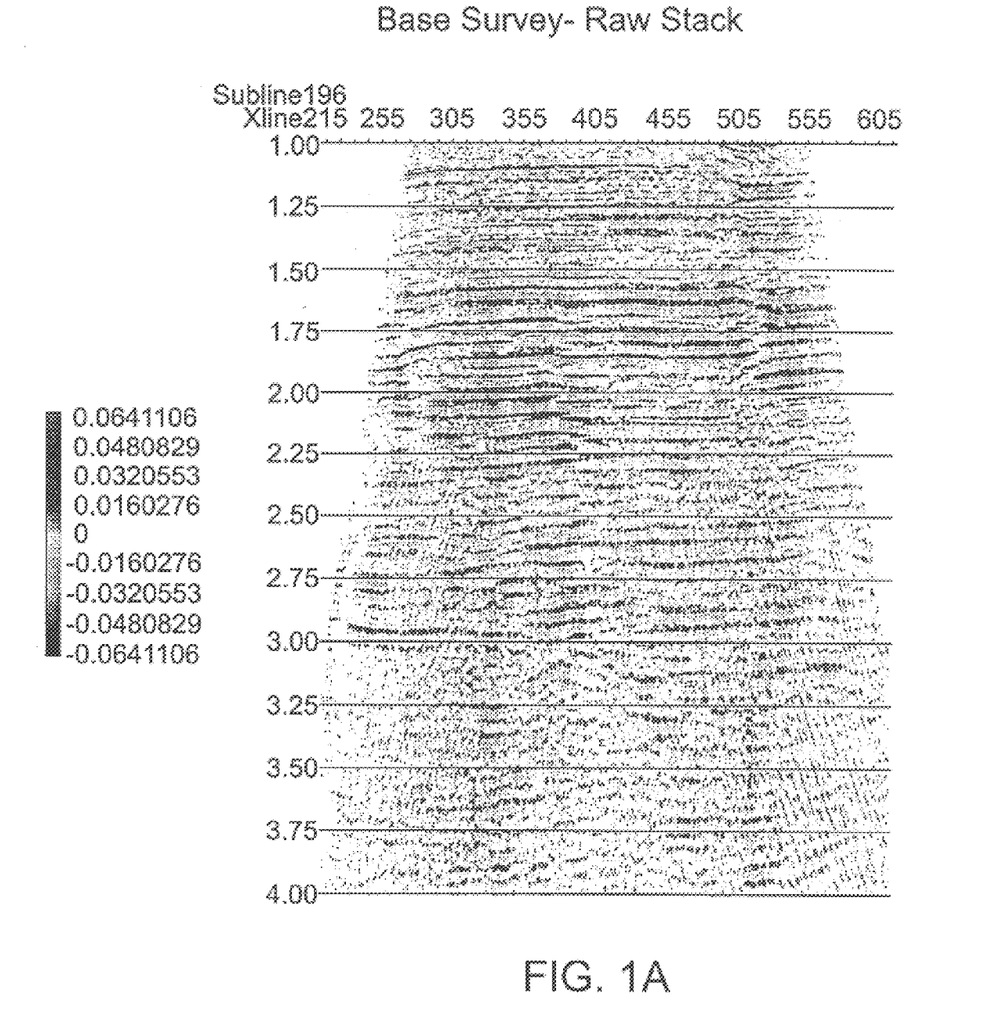
FIG. 1A is a plot of a first record of a survey taken at a first time, without deconvolution.
Figure 1B:
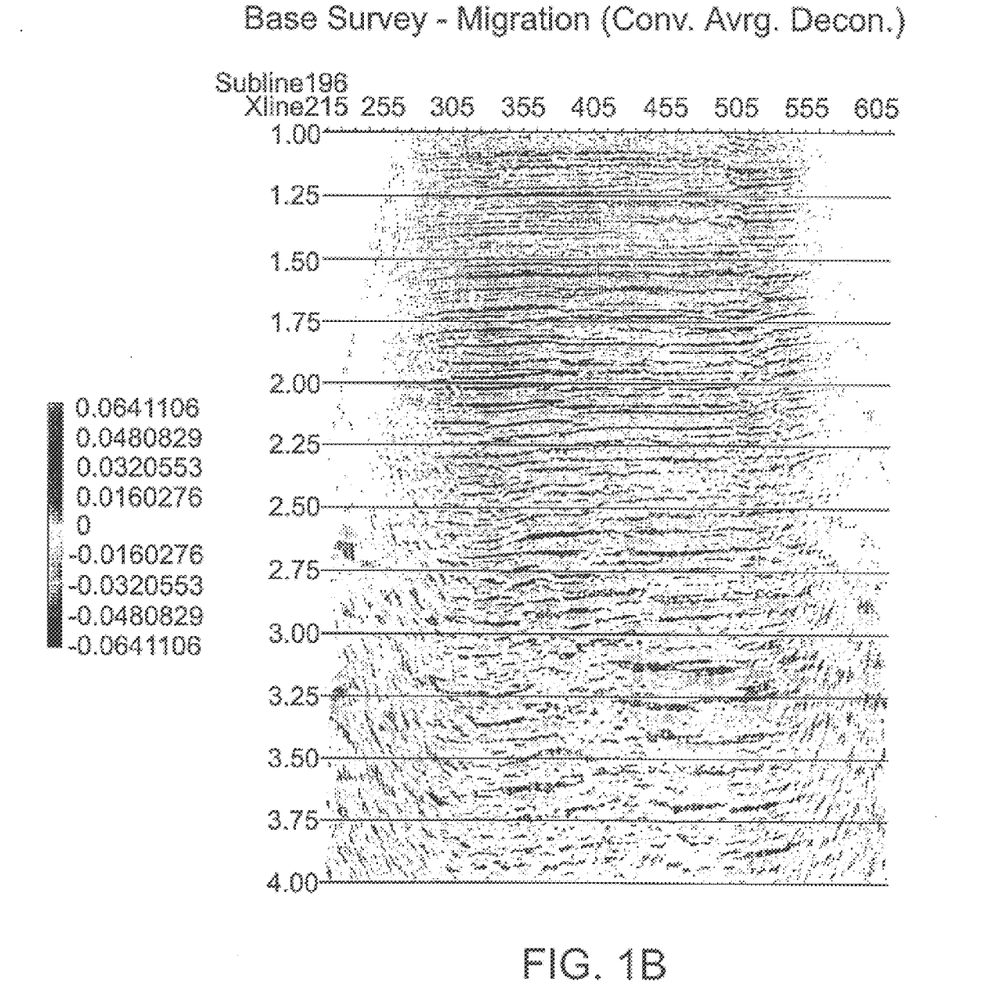
FIG. 1B is a plot of the first record of FIG. 1A with deconvolution, wherein the deconvolution operator was designed dependent upon the data of the first record.

Referring now to FIG. 1A, a specific example will be discussed. FIG. 1A shows a plot of a first raw stack (no DMO, migration, or other noise suppression used, only spherical divergence and geometry correction) of a survey taken at a first time is shown, without deconvolution. FIG. 1B is a plot of the first record of FIG. 1A with deconvolution, wherein the deconvolution operator was designed before the stack dependent upon the data of the first raw stack. The specific parameters were:

Sample rate: 2 milliseconds
Opperator Length: 140 milliseconds
Prediction gap: Spiking, 2 milliseconds
Analysis Window: Offset dependent: for the near offsets, 300–5000 msec., for the far offsets, 3600–5000 msec.
Added white noise: 0.5%
Decon apply window: 0–600 msec.

Figure 2A:
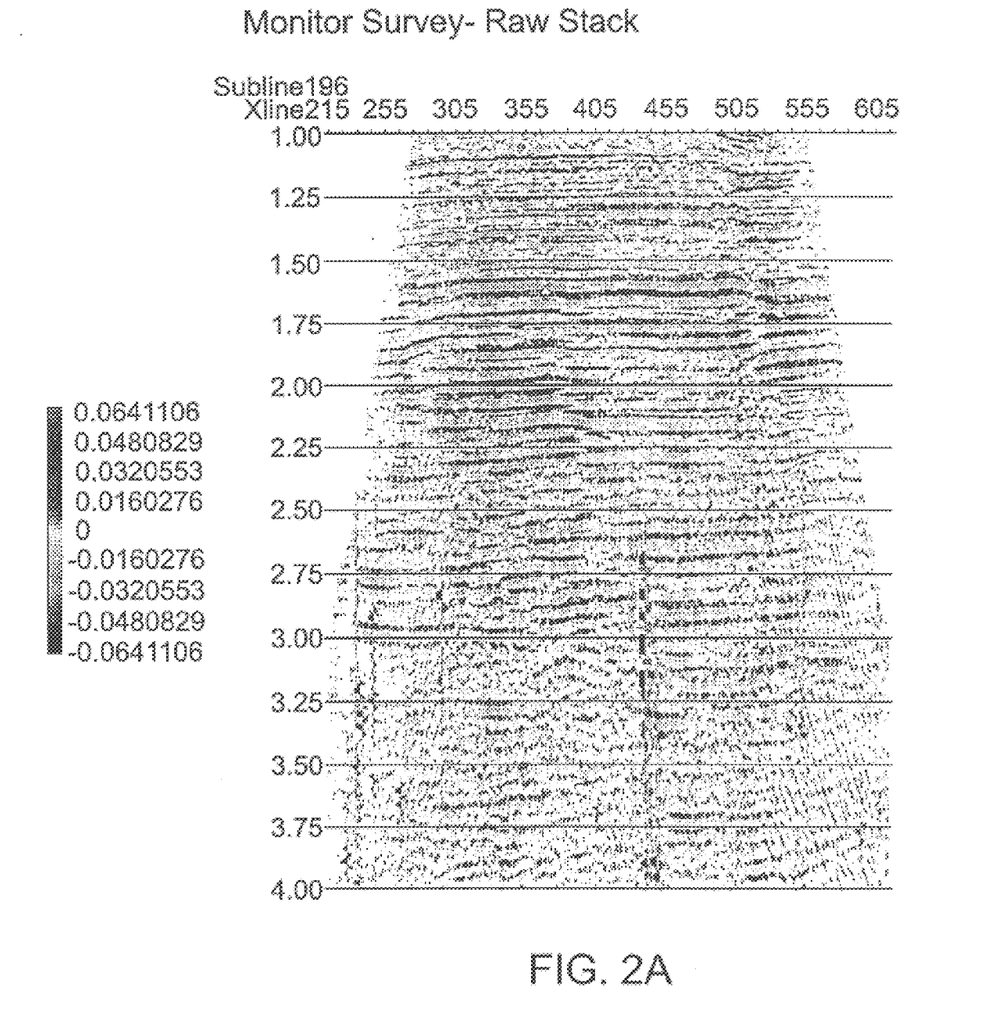
FIG. 2A is a plot of a second record of a second survey taken of the same geographic area as that of FIG. 1A, but at a different time, without deconvolution.
Figure 2B:
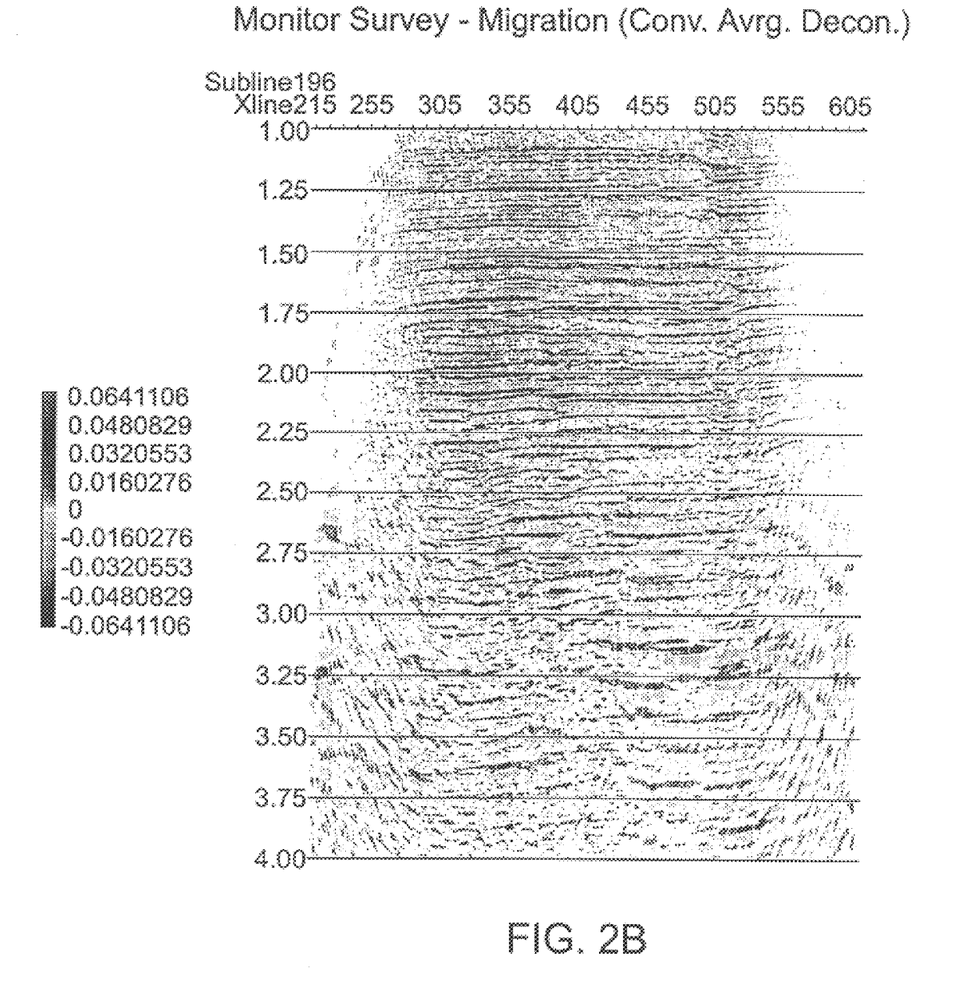
FIG. 2B is a plot of the second record of FIG. 2A, with deconvolution, wherein the deconvolution operator was designed dependent upon the data of the second record.

FIG. 2A is a plot of a second raw stack of a second survey taken of the same geographic area as that of FIG. 1A, but at a different time, without deconvolution, and FIG. 2B is a plot of the second record of FIG. 2A, with deconvolution, wherein the deconvolution operator was designed before the stack dependent upon the data of the second raw stack. Here, the specific parameters were as above.

Figure 3A:
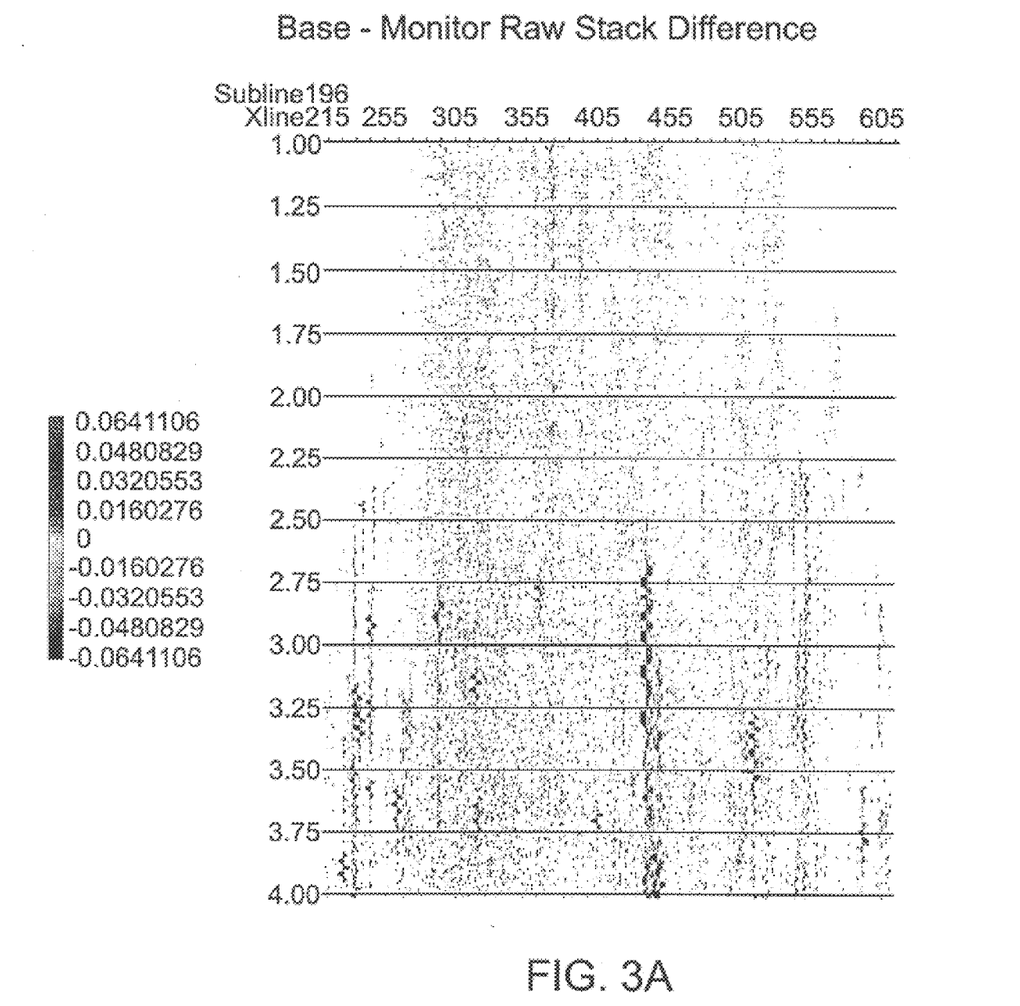
FIG. 3A is a plot of the difference between FIGS. 1A and 2C.
Figure 3B:
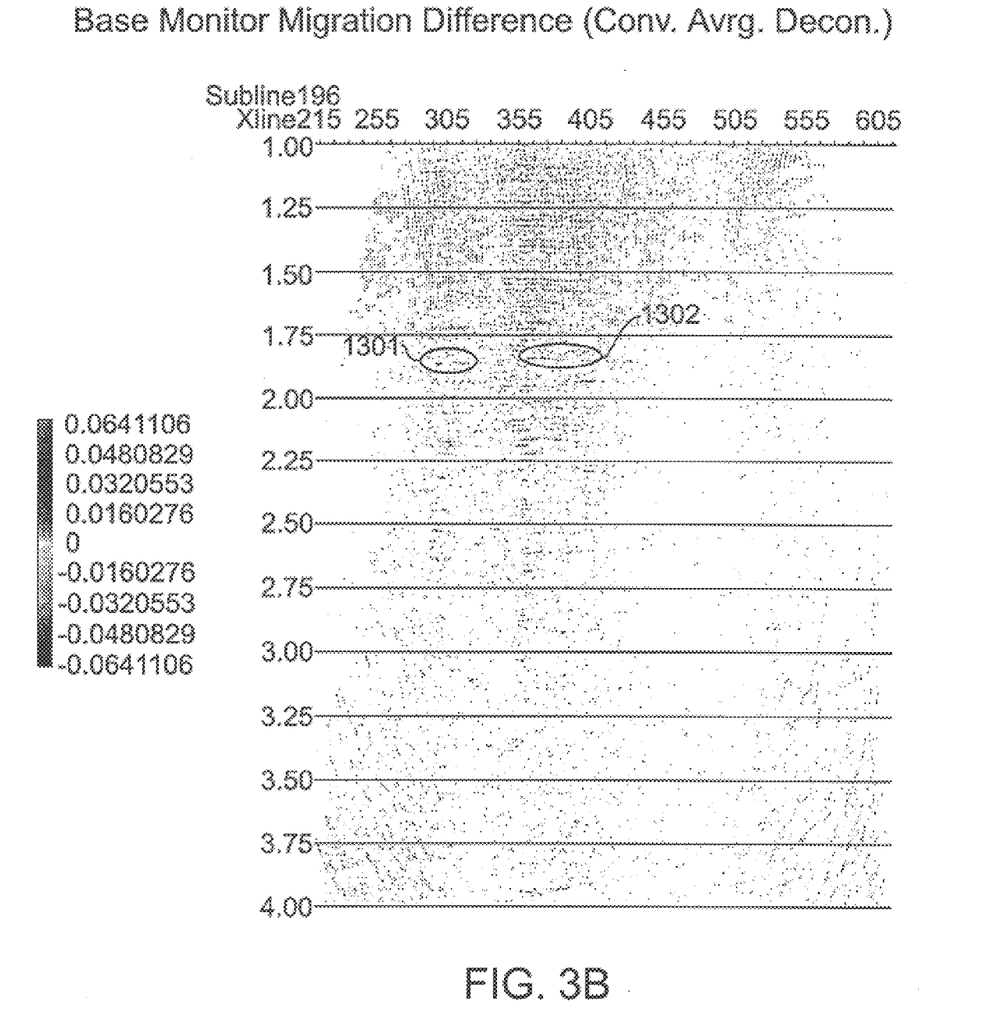
FIG. 3B is a plot of the difference between FIGS. 1B and 2B

FIG. 3A is a plot of the difference in FIGS. 1A and 2A. FIG. 3B is a plot of the difference between FIGS. 1B and 2B. Ideally, there would be nothing but noise or changes in structure showing in difference plot of FIG. 3A, if the two surveys were otherwise identical and there had been no change in the state of the reservoir. However, it can be seen that unchanged structure appears in the difference plot 3B.

Figure 1C:
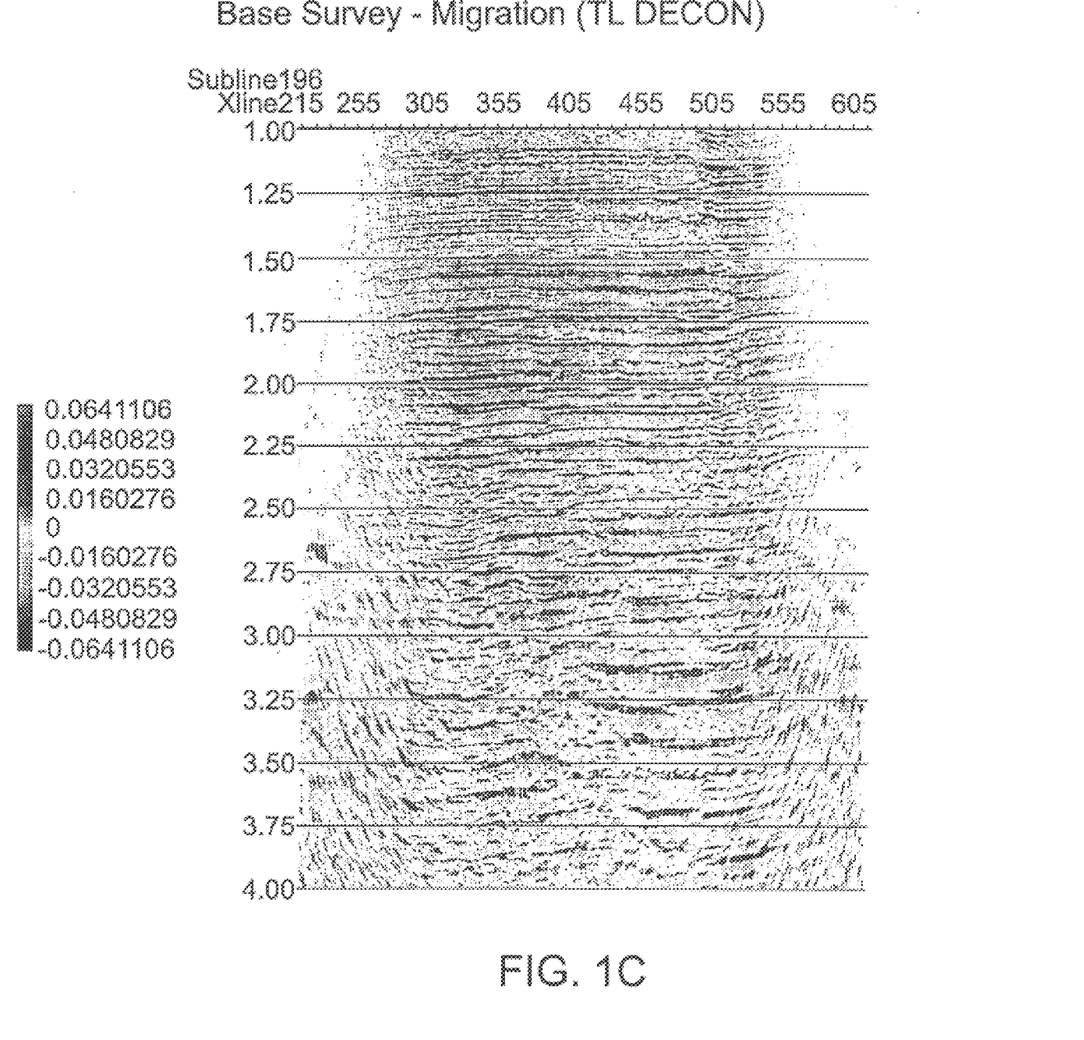
FIG. 1C is a plot of the raw data of FIG. 1A with deconvolution applied, wherein the deconvolution operator was designed dependent on both the data of FIG. 1A and another survey.
Figure 2C:
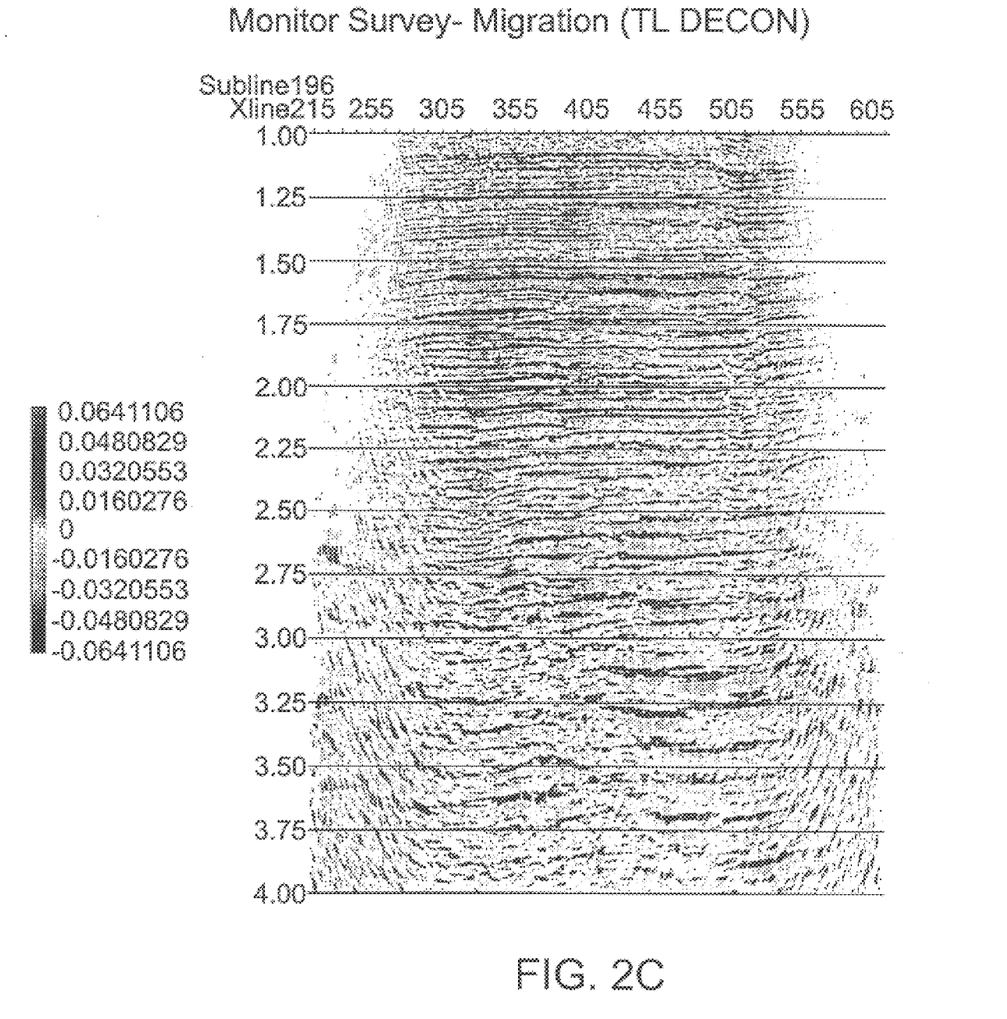
FIG. 2C is a plot of the second record of FIG. 2A, with deconvolution, wherein the deconvolution operator was designed dependent upon the data of both the record of FIG. 1A and the record of FIG. 2A.

FIG. 1C is a plot of the first stack of FIG. 1A, with pre-stack deconvolution, wherein the deconvolution operator was designed dependent upon the data of the first record and the second stack. FIG. 2C is a plot of the second stack of FIG. 2A, with pre-stack deconvolution, wherein the deconvolution operator was designed dependent upon the data of the first record and the second record. The specific parameters were, for both FIGS. 1C and 2C, the same as for FIG. 1A.

Figure 3C:
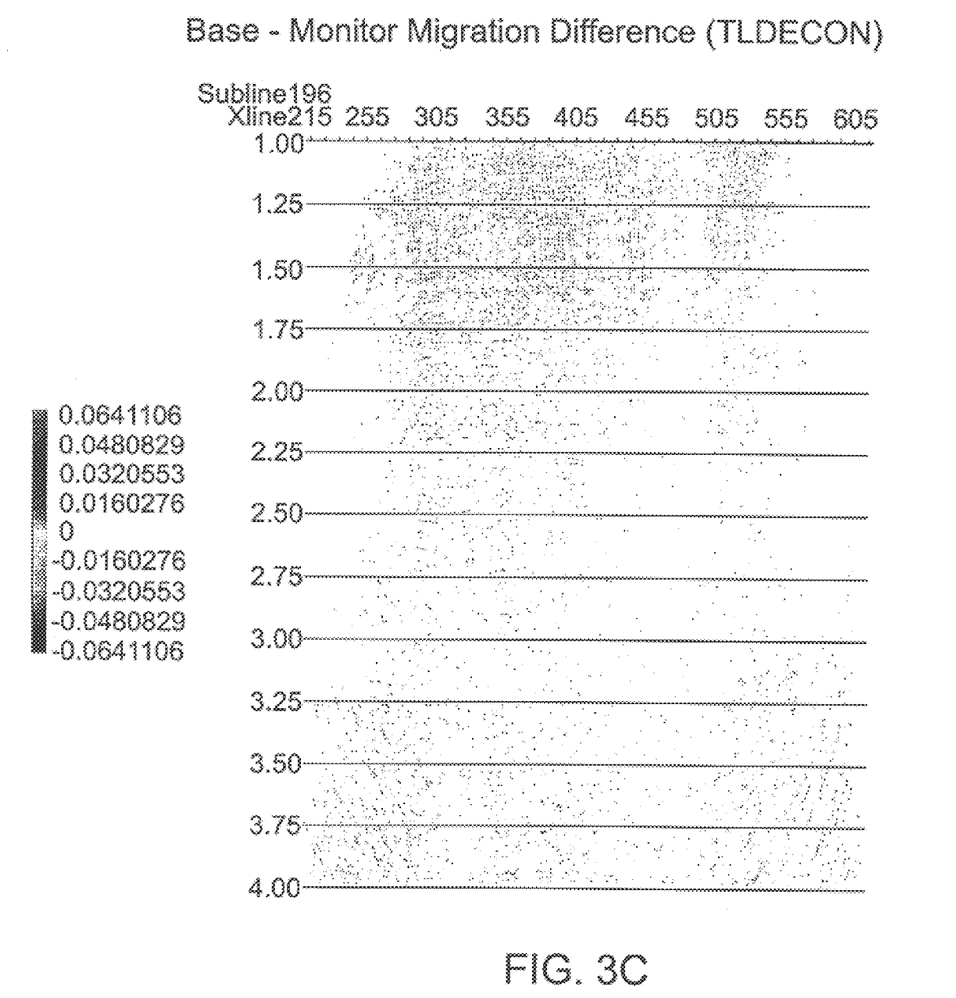
FIG. 3C is a plot of the difference between FIGS. 1C and 2C

FIG. 3C is a plot of the difference between the plots of FIGS. 1C and 2C. Notice the lack of unchanged structure.

In designing the deconvolution filter used some embodiments, the first (i.e. "base") dataset is processed, wherein the average of the trace autocorrelation functions within each ensemble (i.e. shot, receiver, CMP, etc.) is computed in the f-x domain, to estimate the power spectrum:

i=0

$$\overline{P}(i,k) = (1/N)\sum_{k=1}^{N} P(i,k), i = 1, \ldots Q$$

where:
N is the number of traces in the x direction,
Q is the nyquist frequency index,
P(i, k) is the power spectrum estimation at frequency index i and trace number k, and
i is the time-lapse index.

Next, an inverse FFT is performed and the autocorrelation function traces for each ensemble are saved. The same power spectrum estimation is performed on a dataset taken at a different time (i.e. a "monitor" dataset) to compute:

i=0
P(i, k)

where i=1 is the first time lapse monitor survey.

Next, the all the time lapse autocorrelation average functions are averaged to generate updated autocorrelation functions, according to the following formula:

$$\overline{A}_{BM} = \sum_{l=1}^{M} \frac{P^l}{M}$$

i=1, . . . M where M is the number of time lapses.

The resulting autocorrelation traces are used to design convolution filters which are applied to all the time lapse surveys.

Other deconvolution filter design processes (e.g., single window deconvolution, time varying deconvolution, surface consistent deconvolution, and common domain deconvolution (shot, receiver, midpoint, offset)) will occur to those of skill in the art, which are dependent upon both sets of data, which do not depart from the spirit of the present invention.

Further, like the deconvolution operation described above, there are other processing steps which benefit under one aspect of the present invention by designing the process parameters dependent upon the data from each set, rather than the date from one set. Examples include: crossequalization (discussed in more detail below), f-k filtering, τ-p and Radon domain filtering, static calculations, and multiple removal in FK, τ-p, and Radon domains.

There are always variations in actual acquisition, no matter how well operations are planned or executed. And, in an ideal world the processing would also be identical, because the acquisition would be replicated from base survey to monitor survey. But that is not realistic. Thus, intersurvey acquisition variations occur with many systems that are useful with the present invention (for example, fixed installation systems, OBS systems, and streamer systems). These variations could be caused by feathering, cable drift, shooting azimuth, source variation, sea state conditions, etc., which can result in processing variations between surveys.

Crossequalization

According to one example embodiment of the invention, there are four "correction" elements the crossequalization function used. They are timing corrections, RMS energy balancing, bandwidth normalizing, and phase matching. Each element essentially builds a transfer or impulse response function between the two surveys, or alternatively, between two traces in each survey. The resultant, crossequalized trace ($t_{XEQ}$) is calculated in the following manner:

$$t_{XEQ} = t * f(s_{corr}, rms_{corr}, m_{corr}, p_{corr}) \qquad (1)$$

where t is the input trace, * connotes convolution, and $s_{corr}$, $rms_{corr}$, $m_{corr}$ and $p_{corr}$ are crossequalization elements (in impulse response f) corresponding to time, amplitude, magnitude, and phase, respectively.

According to alternative embodiments of the invention, impulse response functions are computed trace-by-trace, in a surface consistent manner, or globally from the base-line survey (base) and the monitor survey (repeat). According to the present example embodiment, a monitor survey is transformed (crossequalized) to look like a base survey, and the crossequalization impulse response functions are designed by horizon-specific time gates that exclude the reservoir zone where change is anticipated.

The effects of each component through simple models and example data from a time-lapse three-dimensional project will now be explained.

Crossequalization Elements

Time Corrections ($s_{corr}$)

Besides rough seas in a storm and current conditions that may cause streamer feathering, tidal and temperature changes are also in play. These changes may not be significant when recording, processing or interpreting seismic data for a single 3D survey. However, when several 3D surveys are involved for time-lapse monitoring, there are potential intersurvey sea state variations.

Seasonal and shorter-period (storm related) variations in temperature and salinity can also cause intersurvey differences between time reflectors. The degree of variation is a function of the severity of the change between the temperature and salinity profiles and the depth of these variations in the water column. For example, surveys taken in the East China sea show that over a 10 year period large scale, seasonal variations are conspicuous, and they are sufficient to cause a temporal intersurvey variation of two milliseconds (TWT) between reference reflectors during seasonal extremes (if acquired in January and June, per se), where water depths are equal to or greater than 100 m.

As for tidal changes, an extreme example would be to shoot seismic data in the Bay of Fundy, between the Canadian Atlantic provinces of New Brunswick and Nova Scotia. Here, the tidal changes are approximately 15 m that is equivalent to 20 ms two-way time (assuming a typical water velocity of 1500 m/s). If one survey was acquired at low tide and another at high tide (assuming very short survey periods), seismic differencing of the datasets without a time correction would not yield satisfactory results.

In general, the errors increase with increasing delay, and broader bandwidth wavelets obtain larger error differences at shorter delays.

RMS Energy Balancing ($rms_{corr}$)

In a perfect time-lapse seismic monitoring experiment, the same seismic crew would acquire each monitor survey with the exact same equipment, under the exact (sea state) conditions that the original baseline survey was acquired with. However, acquisition differences do occur, even under the best controlled situations. For example, scaling the data to equivalent RMS levels is important, especially if it (the RMS energy) alters significantly between surveys.

In one example, from approximately 100 CMPs in a time-lapse 3D dataset acquired by streamer vessels approximately 18 months apart, acquisition geometry and instrumentation were nearly identical, with the exception that one survey was acquired in the summer months and the other in the winter. Analysis of the average amplitude of the seismic data within discrete 200 ms windows shows that there is amplitude bias between the base survey and the monitor survey throughout the profile. After application of a smoothed, amplitude-scaling crossequalization element within each 200 ms time gate, it was seen that the disparities between the base and monitor surveys are smaller after crossequalization. Without question, variations such as these need to be corrected before time-lapse seismic difference sections/surveys can be interpreted.

Bandwidth Normalization ($m_{corr}$)

Equating bandwidths is also part of seismic differencing. If two seismic volumes are to be subtracted, it would be best to do so with each volume having equivalent spectra. Crossequalization (if robust enough), should correct one spectrum to match another, but if the crossequalization is not optimized, discrepancies appear. Larger errors occur for large mismatches in bandwidth. Tests indicate that residual reflector energy (i.e. energy left in the difference section/survey that, ideally, should be removed) ranges from 7% to 40% of input amplitude for center frequency differences of 2.5 to 12.5 Hz, respectively (for Ricker wavelets with center frequencies incrementally separated by 2.5 Hz subtracted from a baseline 30 Hz Ricker wavelet). A maximum center frequency spread of 12.5 Hz is reasonable for most vintage 3D surveys, but larger bandwidth difference occurs in some cases, and, in those cases, the residual reflector energy is larger. Therefore, according to embodiments processing these surveys, crossequalization normalizes the bandwidth differences to reduce these potential seismic differencing errors.

Phase Matching ($p_{corr}$)

Finally, errors are also associated with phase mismatches. For example, for a 30 Hz Ricker wavelet, phase-rotated by a constant 5, 10, 15, 30, 60 and 90 degrees from zero-phase, residual reflector energy caused by phase differences can be as large as 20% of the input for phase mismatches as small as 15 degrees. Further, the human eye can have difficulty seeing phase differences of 15 degrees or less, so it is significant that the crossequalization operator correct for small phase mismatches as well as large ones. Phase difference errors are unaffected by bandwidth differences. It has been found that residual reflector errors of 20% can occur for wavelets out of phase by 15 degrees.

Seismic Differencing

The ultimate goal in time-lapse seismic monitoring is to see changes that infer interpore fluid movement or the absence of interpore fluid movement between calendar dates. Currently this is obtained by subtracting a monitor survey from the base survey after rectifying the data through crossequalization. Differenced data with reduced amounts of residual reflector energy will have a higher probability of identifying fluid movement than those with higher residual reflector energy. To characterize the effectiveness of crossequalization, we show several difference plots with various component crossequalization applications using a North Sea time-lapse experiment. Migrated inline stacks of the base and monitor survey traversing a non-reservoir area are presented in FIGS. 4 and 5, respectively, and a prominent series of strong static reflectors is visible between 2000 and 2600 ms. For this example a design window of 1900 ms to 2700 ms is used. An 800 ms operator was created and applied from the design window, and a bandpass filter of 3/8–35\55 Hz was applied to both datasets before crossequalization. Since these are static reflectors (i.e., they are reflection events representing an unchanged portion of the geologic structure in or near the reservoir), subtraction of the base and monitor survey should ideally result in very little residual reflector energy, since both surveys were acquired identically. However, the difference section obtained without any crossequalization, showed that subtraction did not. The residual reflector energy is significant. With these large amounts of residual reflector energy left in this section, identifying any fluid movement (elsewhere) in reservoir portions of the volume would be difficult.

Comparison of a difference section obtained without any crossequalization with one in which only the amplitude spectrum was crossequalized, one in which only the phase spectrum was crossequalized, and one in which both were crossequalized, shows that phase corrections are a major component of the total crossequalization operation, which reiterates the synthetic modeling results.

The above processing is performed on a massively parallel processor platform (e.g. IBM SP2, Intel Paragon) and software compatible with such hardware (e.g. PGS Tensor Inc.'s CUBE MANAGER™ software).

Suggested Readings

Two published case histories on time-lapse seismic monitoring are Greaves and Fulp (Geophysics, 1987), incorporated herein by reference, who monitor a fire-flood in west Texas, and Johnstad, Uden and Dunlop (First Break, 1993), also incorporated herein by reference, monitoring gas injection in the Oseberg Field located in the Norwegian sector of the North Sea. Another good paper involving a steam flood in the Duri Field in Indonesia was presented by Lumley, et. al. at the 1995 SEG meeting in Houston, which can be through the SEG.

The above description is given by way of example only and other embodiments will occur to those of skill in the art without departing from the scope of the invention which is defined by the claims below and equivalents thereof.

What is claimed is:

1. A method of comparing multiple seismic survey data sets of a reservoir, wherein a first seismic survey data set is taken at a first time and a second seismic survey data set is taken at a second time, to detect changes in the reservoir between the first time and the second time, the method comprising:

providing a first reflection event in the first seismic survey data set having a corresponding second reflection event in the second seismic survey data set,
wherein the first reflection event and the second reflection event represent an unchanged portion of geologic structure in or near the reservoir and
wherein the first reflection event is represented by a first set of event parameters and the second reflection event is represented by a second set of event parameters;

providing an acceptance threshold difference function between the first set of event parameters and the second set of event parameters;

determining a crossequalization function to apply to the second set of event parameters, the crossequalization function being characterized in that, upon application of the crossequalization function to the second set of event parameters, whereby a crossequalized set of event parameters is defined, and the difference between the first set of event parameters and the crossequalized set of event parameters is below the threshold difference function;

applying the crossequalization function to a third reflection event, the third reflection event being related to the second data set,
wherein a crossequalized third reflection event is defined,
wherein the third reflection event has a corresponding fourth reflection event in the first data set, and
wherein the third and fourth reflection events represent a changing portion of the reservoir;

comparing the crossequalized third reflection event to the fourth reflection event by subtracting the crossequalized third reflection event from the fourth reflection event.

2. A method as in claim 1 wherein said providing said acceptance threshold difference function comprises:

iterative selection of event parameter modifications to the second set of event parameters, application of the event parameter modifications to the second set of event parameters, wherein a modified set of event parameters is defined, comparison of the modified set of event parameters to the first set of event parameters, wherein said iterative selection continues until a convergence is reached, and wherein the acceptance threshold difference function comprises the modified set of event parameters at convergence.

3. A method as in claim 2 wherein one of said event parameters comprise amplitude.

4. A method as in claim 2 wherein one of said event parameters comprise phase.

5. A method as in claim 2 wherein one of said event parameters comprise bandwidth.

6. A method as in claim 2 wherein one of said event parameters comprise time.

7. A method as in claim 2 wherein said event parameters comprise amplitude, phase, bandwidth, and time.

8. A method as in claim 1 wherein said determining a crossequalization function comprises:

iterative selection of event parameter modifications to the second set of event parameters, application of the event parameter modifications to the second set of event parameters, wherein a modified set of event parameters is defined, comparison of the modified set of event parameters to the first set of event parameters, and providing an acceptance threshold difference, wherein said iterative selection continues until a comparison result from said comparison designates a difference between the first set of event parameters and the modified set of event parameters below the acceptance threshold difference.

9. A method as in claim 1 wherein said providing an acceptance threshold difference function comprises:
provide a windowed trace difference between a time window of a first trace from the first seismic survey data set and a time window of a second trace from the second seismic survey data set,
wherein the second trace includes reflection events corresponding to reflection events in the first trace and
wherein the time window of the second trace is substantially the same as the time window of the first trace, and
providing a ratio of the windowed trace difference over the time window of the first trace,
choosing the acceptance threshold difference to be less than the ratio.

10. A method as in claim 9 wherein the difference in bandwidth of the time window of the first trace and the time window of the second trace is less than about 25%.

11. A method as in claim 10 wherein the difference in width of the time window of the second trace and the bandwidth of the time window of the first trace is less than about 10%.

12. A method as in claim 1 wherein said providing an acceptance threshold difference function comprises:
providing a windowed trace difference between a time window of the square of a first trace from the first seismic survey data set and a time window of the square of a second trace from the second seismic survey data set,
wherein the second trace includes reflection events corresponding to reflection events in the first trace and
wherein the time window of the second trace is substantially the same as the time window of the first trace, and
providing a ratio of the windowed trace difference over the time window of the square of the first trace,
choosing the acceptance threshold difference to be less than the ratio.

13. A method as in claim 12 wherein the time window has a length of at least about two reflection events.

14. A method as in claim 13 wherein the time window has a length of at least about five reflection events.

15. A method as in claim 1 wherein said applying the crossequalization function to a third reflection event in the second data set comprises convolution between the crossequalization function and the third reflection event in the second data set.

16. A method as in claim 1 wherein said first data set comprises a trace from a seismic receiver.

17. A method as in claim 1 wherein said first data set and said second data set comprise a summed set of traces from a set of seismic receivers.

18. A method as in claim 1 wherein said first data set and said second data set comprise a summed set of traces from a set of borehole receivers.

19. A method as in claim 1 wherein said first data set and said second data set comprise prestack data.

20. A method as in claim 19 wherein said prestack data comprises CMP data.

21. A method as in claim 19 wherein said prestack data comprises shot data.

22. A method as in claim 19 wherein said prestack data comprises migrated data.

23. A method as in claim 1 wherein said first data set and said second data set are subjected to equivalent prestack processes.

24. A method as in claim 1 wherein the first data set is subjected to the same designature process as the second data set.

25. A method as in claim 1 wherein the first data set is subjected to the same deconvolution process as the second data set.

26. A method as in claim 1 wherein the first data set is subjected to the same noise attenuation processing steps as second data set.

27. A method as in claim 1 wherein the first data set is subjected to the same multiple attenuation processing as the second data set.

28. A method as in claim 1 wherein the same DMO operator is used on first data set as on the second data set.

29. A method as in claim 1 wherein migration on the first data set is conducted with the same velocity field as migration on the second data set.

30. A method as in claim 1 wherein migration on the first data set is conducted with the same migration operator as migration on the second data set.

31. A method as in claim 1 wherein filtering on the first data set is conducted with the same filter as filtering on the second data set.

32. A method of deconvolution of multiple sets of seismic data from the same geographic area is provided, the method comprising:
designing of a deconvolution operator dependent upon data from at least two of the sets of seismic data, wherein the at least two sets of seismic data were recorded at different times;
applying the deconvolution operator in a deconvolution process to both of the at least two sets of data; and
conducting further time-lapse processing to form a difference record.

33. A method as in claim 32, wherein the at least two of the sets of data comprises at least three sets of seismic data, wherein each of the at least three sets represents recordings from surveys conducted at different times, and wherein the designing of a deconvolution operator is dependent upon data from each of the sets of surveys.

34. A method as in claim 32,
wherein the at least two of the sets of data comprises at least three sets of seismic data,
wherein each of the at least three sets represents recordings from surveys conducted at different times, and
wherein the designing comprises designing a first deconvolution operator dependent upon data from a first set of data and a second set of data, the first deconvolution operator being applied to the first set of data and the second set of data,
and further comprising:
designing a second deconvolution operator dependent upon data from the first and a third set of data, the second deconvolution operator being applied to the first set of data and the third set of data.

35. A method as in claim 34, wherein the first set of data represents recordings from a survey taken before a survey represented by the second or third sets of data.

36. A method as in claim 34, wherein the designing of the first deconvolution operator comprises:
averaging of a power spectrum for a first ensemble of traces from the first set;
inverse transforming the average into a time-domain representation of the average for the power spectrum of the first ensemble;

storing the time-domain representation;

averaging of a power spectrum for a second ensemble of traces from the second set;

inverse transforming the average into a time-domain representation of the average of the power spectrum for the second ensemble;

averaging of the time-domain representations of the averages for the power spectrum of the first and the second ensemble; and designing a deconvolution operator for the first and the second survey from the average of the time-domain representations of the averages for the power spectrum of the first and the second ensemble.

37. A method as in claim 32, wherein the designing of the a deconvolution operator comprises:

averaging of a power spectrum for a first ensemble of traces from the first set;

averaging of a power spectrum for a second ensemble of traces from the second set;

averaging of the power spectrum averages of the first and the second ensemble; and designing a deconvolution operator for the first and the second survey from the averaging of the power spectrums of the first and the second ensemble.

38. A method for performing time-lapse seismic survey, signal processing, having at least a first survey and a second survey, wherein each survey has a set of seismic data, the method comprising:

performing a set of processing steps on the first survey;

performing the set of processing steps on the second survey;

wherein the set of processing steps is dependent upon a set of seismic signal parameters;

choosing at least one of the set of parameters by a selection process dependent upon data from both the first survey and the second survey; and applying the at least one of the set of parameters in the at least one of the set of processing steps to both the first survey and the second survey.

39. A method as in claim 38 wherein the at least one of the sets of parameters comprises a deconvolution operator.

40. A method as in claim 39 further comprising:

designing of a deconvolution operator dependent upon data from at least two of the sets of seismic data, wherein the at least two sets of seismic data were recorded at different times;

applying the deconvolution operator in a deconvolution process to both of the at least two sets of seismic data; and forming a difference record dependent upon the applying the deconvolution operator in the deconvolution process to both of the at least two sets of seismic data.

41. A method as in claim 40, wherein the at least two of the sets of seismic data comprises at least three sets of seismic data, wherein each of the at least three sets represents recordings from surveys conducted at different times, and wherein the designing of a deconvolution operator is dependent upon data from each of the at least three sets of seismic data.

42. A method as in claim 40, wherein the at least two of the sets of seismic data comprises at least three sets of seismic data, wherein each of the at least three sets represents recordings from surveys conducted at different times, and wherein the designing comprises designing a first deconvolution operator dependent upon data from a first set of data and a second set of data, the first deconvolution operator being applied to the first set of data and the second set of data, and further comprising:

designing a second deconvolution operator dependent upon data from the first set of data and a third set of data, the second deconvolution operator being applied to the first set of data and the third set of data.

43. A method as in claim 42, wherein the first set of data represents recordings from a survey taken before a survey represented by the second or third sets of data.

44. A method as in claim 42, wherein the designing of the first deconvolution operator comprises:

averaging of a power spectrum for a first ensemble of traces from the first set;

inverse transforming the average into a time-domain representation of the average for the power spectrum of the first ensemble;

storing the time-domain representation;

averaging of a power spectrum for a second ensemble of traces from the second set;

inverse transforming the average into a time-domain representation of the average of the power spectrum for the second ensemble;

averaging of the time-domain representations of the averages for the power spectrum of the first and the second ensemble; and designing a deconvolution operator for the first and the second survey from the average of the time-domain representations of the averages for the power spectrum of the first and the second ensemble.

45. A method as in claim 40, wherein the designing of the deconvolution operator comprises:

averaging of a power spectrum for a first ensemble of traces from the set of data for the first survey;

averaging of a power spectrum for a second ensemble of traces from the set of data for the second survey;

averaging of the power spectrum averages of the first and the second ensemble; and designing a deconvolution operator for the first and the second survey from the averaging of the power spectrums of the first and the second ensemble.

* * * * *